United States Patent [19]
Finkelmann et al.

[11] Patent Number: 5,190,689
[45] Date of Patent: Mar. 2, 1993

[54] POLYMER MATERIALS HAVING LIQUID-CRYSTALLINE PHASES

[75] Inventors: Heino Finkelmann; Friedrich Hessel, both of Freiburg; Rudolf Eidenschink, Münster; Joachim Krause, Dieburg, all of Fed. Rep. of Germany

[73] Assignee: Merck Patent Gesellschaft Mit Beschrankter Haftung, Darmstadt, Fed. Rep. of Germany

[21] Appl. No.: 746,219

[22] Filed: Aug. 16, 1991

Related U.S. Application Data

[63] Continuation of Ser. No. 566,794, Aug. 13, 1990, abandoned, which is a continuation of Ser. No. 912,461, Sep. 29, 1986, abandoned.

[30] Foreign Application Priority Data

Sep. 28, 1985 [DE] Fed. Rep. of Germany ....... 3534646

[51] Int. Cl.$^5$ .................. C09K 19/52; C09K 19/34; C09K 19/12; C09K 19/30
[52] U.S. Cl. .................. 252/299.01; 252/299.6; 252/299.61; 252/299.62; 252/299.63; 252/299.66; 252/299.67
[58] Field of Search .................. 252/299.01, 299.63, 252/299.62, 299.66, 299.6, 299.61, 299.67

[56] References Cited

U.S. PATENT DOCUMENTS

| | | | |
|---|---|---|---|
| 4,239,435 | 10/1981 | Portugall et al. | 252/299.01 |
| 4,358,391 | 11/1982 | Finkelmann et al. | 252/299.01 |
| 4,631,328 | 12/1986 | Ringsdorf et al. | 252/299.01 |
| 4,713,196 | 12/1987 | Praefche et al. | 252/299.01 |
| 4,757,130 | 7/1988 | De Martino | 252/299.01 |

FOREIGN PATENT DOCUMENTS

| | | |
|---|---|---|
| 0060335 | 10/1981 | European Pat. Off. |
| 2831909 | 2/1980 | Fed. Rep. of Germany |
| 2944591 | 5/1981 | Fed. Rep. of Germany |

OTHER PUBLICATIONS

Lenz, Robert W., "Synthetic Routes to Liquid Crystalline Polymers", *Recent Advances in Liquid Crystalline Polymers*, 1983, pp. 3-13 *Makromol. Chem.*, 184, 1489-1496 (1983).

F. Hessel et al., "A New Class of Liquid Crystal Side Chain Polymers Mesogenic Groups Laterally Attached to the Polymer Backbone", Polymer Bulletin 14, 375-378 (1985).

Hartmann F. Leube et al., "Optical Investigations on a Liquid Crystal Side Chain Polymer with Biaxial Nematic and Biaxial Smectic A Phase" *Makromolequelare Chemie.*

*Primary Examiner*—Robert L. Stoll
*Assistant Examiner*—C. Harris
*Attorney, Agent, or Firm*—Millen, White, Zelano and Branigan

[57] ABSTRACT

The invention concerns polymer materials exhibiting liquid-crystalline phases which contain laterally bonded mesogenic groups and processes for the preparation of the polymer materials comprising the polymerization and/or grafting of suitable monomers. The polymer materials according to the invention are used as substrates in the electronics industry for fiber and film technology, for modulating laser beams, and for optical data storage.

24 Claims, No Drawings

POLYMER MATERIALS HAVING LIQUID-CRYSTALLINE PHASES

This application is a continuation of application Ser. No. 07/566,794 filed Aug. 13, 1990, abandoned which is a continuation of Ser. No. 06/912,461 filed Sep. 29, 1986 abandoned.

BACKGROUND OF THE INVENTION

A number of liquid-crystalline side-chain polymers are already known. Thus, for example, German Offenlegungsschrift 2,944,591 and European Patent Specification 0,060,335 describe organopolysiloxanes, and German Offenlegungsschrift 2,831,909 and Springer and Weigelt, Makromol. Chem. 184 (1983) 1489, describe polymethacrylates possessing mesogenic side groups.

The common feature of these known side-chain polymers is that their mesogenic groups are bonded to the polymer backbone, if appropriate via a spacer, at the 4-position in the direction of the longitudinal molecular axis, and hence analogously to the customary wing groups. Such polymer materials frequently have nematic phases at temperatures above 100° C. In many cases, such materials also exhibit crystalline behavior, associated with the lack of mesomorphic properties.

To date, only comparatively small lateral substituents have been considered to be compatible with the occurrence of liquid-crystalline properties (cf. Gray in: *The Molecular Physics of Liquid Crystals* (editors G. R. Luckhurst and G. W. Gray), London-New York-San Francisco 1979, page 1).

Summary of the Invention

An object of the present invention is to provide polymer materials which have liquid-crystalline phases and which possess the disadvantages described above to only a slight extent, if at all.

Upon further study of the specification and appended claims, further objects and advantages of this invention will become apparent to those skilled in the art. It is surprising that the resultant polymers-possess unexpectedly wide mesophase ranges, a birefringence which can be varied within wide limits and a positive as well as negative diamagnetic anisotropy.

The invention therefore relates to polymer materials which have liquid-crystalline phases and the mesogenic groups of which are bonded laterally to the polymer backbone.

These objects are satisfied by providing polymer materials which have liquid-crystalline phases, the mesogenic groups of which are bonded to the polymer backbone laterally, that is to say not terminally, via a ring group or bridging group of the mesogenic unit. Such mesogenic groups correspond to the formula Ia and/or Ib

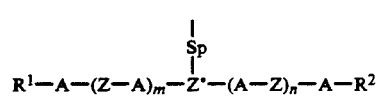

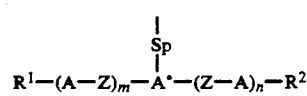

wherein $R^1$ and $R^2$ are alkyl having 1-15 C. atoms, in which furthermore one or two non-adjacent $CH_2$ groups can be replaced with —O—, —CO—, —O—CO—, —CO—O— and/or —CH=CH—, or one of the radicals $R^1$ and $R^2$ may furthermore be H, F, Cl, Br, NCS, $NO_2$, CN or $R^3$—A—Z, $R^3$ is alkyl having 1-15 C. atoms, in which furthermore one or two non-adjacent $CH_2$ groups can be replaced with —O—, —CO—, —O—CO—, —CO—O— and/or —CH=CH—, or is H, F, Cl, Br, NCS or CN, Sp is a covalent bond or a radical of the formula —$Q^1$—$W^1$—$Q^2$—$W^2$—, $Q^1$ and $Q^2$ independently of one another are each a chemical bond and/or an alkylene group having 1 to 25 C. atoms, in which furthermore one or more non-adjacent $CH_2$ groups can be replaced with —O—, —S— or —N($C_1$-$C_6$-alkyl)—, $W^1$ and $W^2$ independently of one another are each a chemical bond and/or a functional grouping from the group comprising —O—, —S—, —SO—, —$SO_2$—, —N($C_1$-$C_6$-alkyl)—, —CO—, —CO—O—, —O—CO—, —O—CO—O—, —CO—S—, —S—CO—, —CO—NH($C_1$-$C_6$-alkyl)—, —NH($C_1$-$C_6$-alkyl)—CO, —O—CO—NH($C_1$-$C_6$-alkyl)— or —NH($C_1$-$C_6$-alkyl)—CO—O and $C_1$-$C_6$-alkyl, A in each case is a 1,4-cyclohexylene group, in which furthermore one or two non-adjacent $CH_2$ groups can be replaced with —O— and/or —S—, and/or which can be substituted in the 1-position by $C_1$-$C_4$-alkyl, F, Cl, Br, $CF_3$ or CN, or is a piperidine-1,4-diyl or 1,4-bicyclo[2.2.2]octylene group or a 1,4-phenylene group which is unsubstituted or substituted by one or two F and/or Cl atoms and/or $CH_3$ groups and/or CN groups and in which furthermore one or more CH groups can be replaced with N, e. g. 1 to 4 CH groups.

$A^0$—Sp— is a radical of the formula (1) or (2)

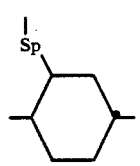

(1)

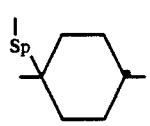

(2)

wherein furthermore one or two non-adjacent $CH_2$ groups can be replaced with —O— and/or —S—, and/or a —$CH_2$—CH group can be replaced with —N=C— or —CH=C— and/or which can be substituted in the 1-position by $C_1$-$C_4$-alkyl, F, Cl, Br, $CF_3$ or CN, or is a radical of the formula (3)

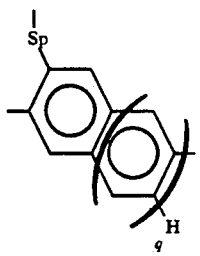

wherein q is 0 to 2 and wherein furthermore one or more CH groups can be replaced with N, and/or which can furthermore be substituted by one or two F and/or Cl atoms and/or CH$_3$ groups and/or CN groups, or is a radical (4), (5) or (6)

(4)

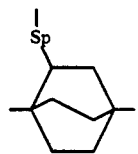

(5)

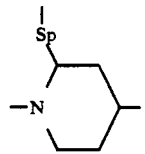

(6)

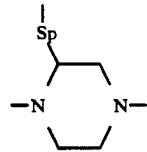

n and m are each 0 to 3,

Z in each case is —CO—O—, —O—CO—, —CH$_2$CH$_2$—, —CHCN—CH$_2$—, —CH$_2$—CHCN—, —CH=CH—, —OCH$_2$—, —CH$_2$O—, —CH=N—, —N=CH—, —NO=N—, —N=NO— or a single bond, and Z$^0$—Sp is —CH$_2$CHSp—, —CSpCN—CH$_2$—, —CHCN—CHSp—, —CSp=CH—, —CHSp—O— or —CSp=N—, with the proviso that m+n is 0 to 3.

Above and below, R$^1$, R$^2$, R$^3$, A, A$^0$, l, m, n, Sp, Q$^1$, Q$^2$, W$^1$, W$^2$, Z and Z$^0$ have the stated meanings, unless expressly stated otherwise.

The compounds of the invention may be readily processed to articles of any shape with anisotropic properties and have high chemical stability.

DETAILED DESCRIPTION

The compounds of the formula Ia/b accordingly comprise compounds having two rings, of the partial formulae Iaa to Iba, wherein (Sp—) is a spacer which possesses the stated meanings and is bonded to the above ring group or bridging group:

| | |
|---|---|
| R$^1$—A$^0$(Sp—)—Z—A—R$^2$ | Iaa |
| R$^1$—A$^0$(Sp—)—A—R$^2$ | Iab |
| R$^1$—A—Z$^0$(Sp—)—A—R$^2$ | Iba, | compounds possessing three rings, of the partial formulae Iac to Ibg:

| | |
|---|---|
| R$^1$—A$^0$(Sp—)—A—Z—Z—R$^2$ | Iac |
| R$^1$—A—A$^0$(Sp—)—Z—A—R$^2$ | Iad |
| R$^1$—A—A—Z—A$^0$(Sp—)—R$^2$ | Iae |
| R$^1$—A$^0$(Sp—)—Z—A—Z—A—R$^2$ | Iaf |
| R$^1$—A—Z—A$^0$(Sp—)—Z—A—R$^2$ | Iag |
| R$^3$—A—Z—A$^0$(Sp—)—Z—A—R$^2$ | Iah |
| R$^3$—A—Z—A—Z—A$^0$(Sp—)—R$^2$ | Iai |
| R$^3$—A$^0$(Sp—)—A—Z—A—R$^2$ | Iaj |
| R$^3$—A—A$^0$(Sp—)—Z—A—R$^2$ | Iak |
| R$^3$—A—A—Z—A$^0$(Sp—)—R$^2$ | Ial |
| R$^1$—A$^0$(Sp—)—A—A—R$^2$ | Iam |
| R$^1$—A—A$^0$(Sp—)—A—R$^2$ | Ian |
| R$^1$—A—A—Z$^0$(Sp—)—A—R$^2$ | Ibc |
| R$^1$—A—Z$^0$(Sp—)—A—Z—R$^2$ | Ibd |
| R$^3$—A—Z$^0$(Sp—)—A—Z—A—R$^2$ | Ibe |
| R$^3$—A—Z—A—Z$^0$(Sp—)—A—R$^2$ | Ibf |
| R$^3$—A—A—Z$^0$(Sp—)—A—R$^2$ | Ibg, | compounds possessing four rings, of the partial formulae Iao to Ibr

| | |
|---|---|
| R$^3$—A$^0$(Sp—)—Z—A—Z—A—Z—A—R$^3$ | Iao |
| R$^3$—A—Z—A$^0$(Sp—)—Z—A—Z—A—R$^3$ | Iap |
| R$^3$—A$^0$(Sp—)—A—Z—A—A—R$^3$ | Iaq |
| R$^3$—A—A$^0$(Sp—)—Z—A—A—R$^3$ | Iar |
| R$^3$—A$^0$(Sp—)—Z—A—A—A—R$^3$ | Ias |
| R$^3$—A—Z—A$^0$(Sp—)—A—A—R$^3$ | Iat |
| R$^3$—A—Z—A—A$^0$(Sp—)—A—R$^3$ | Iat |
| R$^3$—A—Z—A—A$^0$(Sp—)—A—R$^3$ | Iau |
| R$^3$—A—Z—A—A—A$^0$(Sp—)—R$^3$ | Iav |
| R$^1$—A$^0$(Sp—)—A—Z—A—S—A—R$^3$ | Iaw |
| R$^1$—A—A$^0$(Sp—)—Z—A—Z—A—R$^3$ | Iax |
| R$^1$—A—A—Z—A$^0$(Sp—)—Z—A—R$^3$ | Iay |
| R$^1$—A—A—Z—A—Z—A$^0$(Sp—)—R$^3$ | Iaz |
| R$^3$—A$^0$(Sp—)—Z—A—A—Z—A—R$^2$ | Iaaa |
| R$^3$—A—Z—A$^0$(Sp—)—A—Z—A—R$^2$ | Iaab |
| R$^3$—A—Z—A—A$^0$(Sp—)—Z—A—R$^2$ | Iaac |
| R$^3$—A—Z—A—A—Z—A$^0$(Sp—)—R$^2$ | Iaad |

| | |
|---|---|
| $R^1-A^0(Sp-)-A-A-A-R^3$ | Iaae |
| $R^1-A-A^0(Sp-)-A-A-R^3$ | Iaaf |
| $R^1-A-A^0(Sp-)-A-A-R^3$ | Iaaf |
| $R^1-A-A-A^0(Sp-)-A-R^3$ | Iaag |
| $R^1-A-A-A-A^0(Sp-)-R^3$ | Iaah |
| $R^1-A^0(Sp-)-A-A-Z-A-R^3$ | Iaai |
| $R^1-A-A^0(Sp-)-A-Z-A-R^3$ | Iaaj |
| $R^1-A-A-A^0(Sp-)-Z-A-R^3$ | Iaak |
| $R^1-A-A-A-Z-A^0(Sp-)-R^3$ | Iaal |
| $R^1-A^0(Sp-)-A-Z-A-A-R^3$ | Iaam |
| $R^1-A-A^0(Sp-)-Z-A-A-R^3$ | Iaan |
| $R^1-A-A-Z-A^0(Sp-)-A-R^3$ | Iaao |
| $R^1-A-A-Z-A-A^0(Sp-)-R^3$ | Iaap |
| $R^3-A^0(Sp-)-A-A-Z-A-R^2$ | Iaaq |
| $R^3-A-A^0(Sp-)-A-Z-A-R^2$ | Iaar |
| $R^3-A-A-A^0(Sp-)-Z-A-R^2$ | Iaas |
| $R^3-A-A-A-Z-A^0(Sp-)-R^2$ | Iaat |
| $R^3-A-Z^0(Sp-)-A-Z-A-Z-A-R^3$ | Ibh |
| $R^3-A-Z-A-Z^0(Sp-)-A-Z-A-R^3$ | Ibi |
| $R^3-A-A-Z^0(Sp-)-A-A-R^3$ | Ibj |
| $R^3-A-Z^0(Sp-)-A-A-A-R^3$ | Ibk |
| $R^1-A-A-Z^0(Sp-)-A-Z-A-R^3$ | Ibl |
| $R^1-A-A-Z-A-Z^0(Sp-)-A-R^3$ | Ibm |
| $R^3-A-Z^0(Sp-)-A-A-Z-A-R^2$ | Ibn |
| $R^3-A-Z-A-A-Z^0(Sp-)-A-R^2$ | Ibo |
| $R^1-A-A-A-Z^0(Sp-)-A-R^3$ | Ibp |
| $R^1-A-A-Z^0(Sp-)-A-A-R^3$ | Ibq |
| $R^3-A-A-A-Z^0(Sp-)-A-R^3$ | Ibr, | and compounds possessing five rings, of the partial formulae Iaau to Ibv

| | |
|---|---|
| $R^3-A^0(Sp-)-Z-A-A-Z-A-Z-A-R^3$ | Iaau |
| $R^3-A-Z-A^0(Sp-)-A-Z-A-Z-A-R^3$ | Iaav |
| $R^3-A-Z-A-A^0(Sp-)-Z-A-Z-A-R^3$ | Iaaw |
| $R^3-A-Z-A-A-Z-A^0(Sp-)-Z-A-R^3$ | Iaax |
| $R^3-A-Z-A-A-Z-A-Z-A^0(Sp-)-R^3$ | Iaay |
| $R^3-A^0(Sp-)-A-A-A-A-R^3$ | Iaaz |
| $R^3-A-A^0(Sp-)-A-A-A-R^3$ | Iaba |
| $R^3-A-A-A^0(Sp-)-A-A-R^3$ | Iabb |
| $R^3-A^0(Sp-)-A-A-Z-A-A-R^3$ | Iabc |
| $R^3-A-A^0(Sp-)-A-Z-A-A-R^3$ | Iabd |
| $R^3-A-A-A^0(Sp-)-Z-A-A-R^3$ | Iabe |
| $R^3-A-A-A-Z-A^0(Sp-)-A-R^3$ | Iabf |
| $R^3-A-A-A-Z-A-A^0(Sp-)-R^3$ | Iabg |
| $R^3-A-Z^0(Sp-)-A-A-Z-A-Z-A-R^3$ | Ibs |
| $R^3-A-Z-A-A-Z^0(Sp-)-A-Z-A-R^3$ | Ibt |
| $R^3-A-Z-A-A-Z-A-Z^0(Sp-)-A-R^3$ | Ibu |
| $R^3-A-A-A-Z^0(Sp-)-A-A-R^3$ | Ibv. |

In the compounds of the formulae above and below, $R^1$, $R^2$ and $R^3$ are preferably alkyl, but may also be alkoxy.

Other preferred compounds of the formulae above and below are those in which one of the radicals $R^1$, $R^2$ and $R^3$ is CN, F or SCN.

A and $A^0$ independently of one another are each preferably 1,4-cyclohexylene, 1,4-phenylene, 1,3-dioxan-2,5-diyl. or pyridine-2,5-diyl.

Sp is preferably a radical $-Q^1-W^1-Q^2-W^2-$. $Q^1$ and $Q^2$ independently of one another are each preferably alkylene having 1 to 15 C atoms. $W^1$ and $W^2$ independently of one another are each preferably $-O-$, $-S-$, $-O-CO-$, $-CO-O-$ or $-CO-NH-$. n and m independently of one another are each 0 or 1, and in particular n+m is 0 to 2.

The radicals Z independently of one another are each preferably single bonds and are also preferably $-CO-O-$, $O-CO-$ or $-CH_2CH_2-$ groups. $Z^0-Sp$ is preferably $-CH_2-CHSp-$, $-CSp=CH-$ or $CHSp-O-$.

$R^1$, $R^2$, $R^3$, A, $A^0$, Sp, $Q^1$, $Q^2$, $W^1$, $W^2$, Z, $Z^0$, m and n may be identical; however, they are preferably independent of one another and different.

Where $R^1$, $R^2$ and/or $R^3$ are alkyl radicals and/or alkoxy radicals, they may be straight-chain branched. Preferably, they are straight-chain, have 2, 3, 4, 5, 6 or 7 C atoms and are accordingly preferably ethyl, propyl, butyl, pentyl, hexyl, heptyl, ethoxy, propoxy, butoxy, pentyloxy, hexyloxy or heptyloxy, or methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2- (=ethoxymethyl) or 3-oxabutyl (=2-methoxyethyl), 2-, 3- or 4-oxapentyl, 2-, 3-, 4-or 5-oxahexyl, 2-, 3-, 4-, 5- or 6-oxaheptyl, 2-, 3-, 4-, 5-, 6-or 7-oxaoctyl, 2-, 3-, 4-, 5-, 6-, 7- or 8-oxanonyl or 2-, 3-, 4-, 5-, 6-, 7-, 8-or 9-oxadecyl.

Where $R^1$, $R^2$ and/or $R^3$ are alkyl radicals in which a $CH_2$ group is replaced with $-CH=CH-$, these radicals can be straight-chain or branched. They are preferably straight-chain and have 2 to 10 C atoms. Accordingly, they are, in particular, vinyl, prop-1-enyl, prop-2-enyl, but-1-enyl, but-2-enyl, but-3-enyl, pent-1-enyl, pent-2-enyl, pent-3-enyl, pent-4-enyl, hex-1-enyl, hex-2-enyl, hex-3-enyl, hex-4-enyl, hex-5-enyl, hept-1-enyl, hept-2-enyl, hept-3-enyl, hept-4-enyl, hept-5-enyl, hept-6-enyl, oct-1-enyl, oct-2-enyl, oct-3-enyl, oct-4-enyl, oct-5-enyl, oct-6-enyl, oct-7-enyl, non-1-enyl, non-2- enyl, non-3-enyl, non-4-enyl, non-5-enyl, non-6-enyl, non-7-enyl, non-8-enyl, dec-1-enyl, dec-2-enyl, dec-3-enyl, dec-4-enyl, dec-5-enyl, dec-6-enyl, dec-7-enyl, dec-8-enyl or dec-9-enyl.

Because they possess better solubility in the customary liquid-crystalline base materials, compounds of the formulae I having branched wing groups $R^1$, $R^2$ and/or $R^3$ may sometimes be important; however, they are particularly important as chiral dopants when they are optically active. Smectic compounds of this type are suitable components for ferroelectric materials, for chiral tilted smectic phases and as components of nematic liquid-crystalline phases, in particular for avoiding reverse twist.

Branched groups of this type contain, as a rule, no more than one chain branch. Preferred branched radicals $R^1$, $R^2$ and/or $R^3$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentyloxy, 3-methylpentyloxy, 2-ethylhexyloxy, 1-methylhexyloxy and 1-methylheptyloxy.

The above-named alkyl groups are also correspondingly available for the other substituents where alkyl is a possibility.

The formulae Ia and Ib embrace both the racemates of these compounds and the optical antipodes and their mixtures.

Preferred compounds among those of the formula Ia/b and Iaa to Ibv are those in which at least one of the radicals present has the stated preferred meanings.

Compounds corresponding to the mesogenic radicals of the formula Ia or Ib and in which the valence through which the spacer Sp is bonded is saturated with hydrogen or a radical —$Q^1$—H or —$W^1$—H are known liquid crystals and are described in, for example, German Patent Applications P 33 15 295, P 33 46 175, P 34 01 320, P 34 01 321, P 24 04 116 and P 34 11 571; in German Offenlegungsschriften 2,167,252, 2,257,588, 2,429,093, 2,547,737, 2,641,724, 2,944,905, 2,951,099, 3,140,868 and 3,228,350, and in European Published Specifications 0,014,885, 0,084,194, 0,104,011, 0,111,695, 0,122,389 and 0,126,883, all of which disclosures are incorporated by reference herein.

Mesogenic groups which are suitable for lateral bonding to polymers preferably possess the basic structures a to an, in which Phe is 1,4-phenylene, Cyc is trans-1,4-cyclohexylene, Dio is 2,5-dioxan-1,3-diyl and Pym is pyrimidine-2,5-diyl, and $R^1$ and $R^2$ have the meaning given in formula Ia/b:

(a) $R^1$-Phe-Phe-$R^2$
(b) $R^1$-Phe-Cyc-$R^1$
(c) $R^1$-Cyc-Cyc-$R^2$
(d) $R^1$-Phe-Phe-Phe-$R^2$
(e) $R^1$-Cyc-Phe-Phe-$R^2$
(f) $R^1$-Cyc-Phe-Cyc-$R^2$
(g) $R^1$-Cyc-Phe-Phe-Cyc-$R^2$
(h) $R^1$-Phe-$CH_2CH_2$-Phe-$R^2$
(i) $R^1$-Cyc-$CH_2CH_2$-Cyc-$R^2$
(j) $R^1$-Phe-Cyc-$CH_2CH_2$-Phe-$R^2$
(k) $R^1$-Cyc-$CH_2CH_2$-Phe-$R^2$
(l) $R^1$-Phe-$CH_2CH_2$-Phe-Phe-$R^2$
(m) $R^1$-Cyc-CH(CN)-$CH_2$-Cyc-$R^2$
(n) $R^1$-Phe-COO-Phe-$R^2$
(o) $R^1$-Cyc-COO-Phe-$R^2$
(p) $R^1$-Cyc-COO-Phe-Phe-$R^2$
(q) $R^1$-Cyc-Phe-COO-Phe-$R^2$
(r) $R^1$-Cyc-Phe-OCO-Cyc-$R^2$
(s) $R^1$-Phe-Cyc-COO-Phe-$R^2$
(t) $R^1$-Phe-Cyc-OCO-Phe-$R^2$
(u) $R^1$-Phe-Cyc-COO-Cyc-$R^2$
(v) $R^1$-Phe-Phe-COO-Phe-Phe-$R^2$
(w) $R^1$-Cyc-COO-Phe-Phe-$R^2$
(x) $R^1$-Phe-Phe-COO-Phe-$R^2$
(y) $R^1$-Cyc-COO-Phe-COO-Phe-$R^2$
(z) $R^1$-Phe-$CH_2O$-Phe-$R^2$
(aa) $R^1$-Phe-Phe-$CH_2O$-Phe-$R^2$
(ab) $R^1$-Cyc-Phe-$CH_2O$-Phe-$R^2$
(ac) $R^1$-Phe-Cyc-$CH_2O$-Phe-$R^2$
(ad) $R^1$-Dio-Phe-$R^2$
(ae) $R^1$-Dio-Cyc-$R^2$
(af) $R^1$-Cyc-Dio-Phe-$R^2$
(ag) $R^1$-Dio-Cyc-Phe-$R^2$
(ah) $R^1$-Dio-Phe-COO-Phe-$R^2$
(ai) $R^1$-Dio-Cyc-COO-Phe-$R^2$
(aj) $R^1$-Pym-Phe-$R^2$
(ak) $R^1$-Cyc-Pym-Phe-$R^2$
(al) $R^1$-Pym-Phe-COO-Phe-$R^2$
(am) $R^1$-Pym-Phe-$CH_2O$-Phe-$R^2$
(an) $R^1$-Pym-Phe-OCO-Phe-$R^2$

The spacer Sp can be bonded either to one of the ring groups Phe, Cyc, Dio or Pym or to a bridging group —$CH_2O$—, —$CH_2CH_2$— or —CH(CN)—$CH_2$—.

The invention furthermore relates to a process for the preparation of polymer materials according to this invention.

Thus, compounds of the formula II $$Y—M \qquad\qquad II$$

wherein M is a mesogenic group of the formula Ia/b and Y is a functional group capable of polymerization or of being grafted, can be polymerized, provided that Y is an alkylene group which has 2 to 5 carbon atoms and is present in the $\omega$- or ($\omega$-1)-position. Y can be bonded to the spacer Sp directly (—$Q^1$—$W^1$—$Q^2$—Y) or via a functional group (—$Q^1$—$W^1$—$Q^2$—$W^2$—Y).

Particularly preferred functional groups are —O—, —CO—O—, —CO—NH— and —S—, in particular —O— and —CO—O—.

Polymer materials according to the invention can be prepared from compounds of the formula II, wherein Y is an alkylene group which has 2 to 5 C. atoms and is present in the $\omega$- or ($\omega$-1)-position, also by copolymerization with other olefinically unsaturated monomers. Examples of suitable comonomers are $C_1$–$C_{20}$-alkyl esters of acrylic and/or methacrylic acid, styrene, $\alpha$-methylstyrene, 4-methylstyrene, acrylonitrile, methacrylonitrile and methylenemalonates.

The polymerization is carried out in a manner known per se, by reaction of radiant energy, heat energy electrical energy and by the reaction of free radical or ionic catalysts, as described in, for example, Ocian, Principles of Polymerization, McGraw-Hill, New York, 1970, which disclosure is incorporated by reference herein. Suitable sources of radiant energy are UV radiation, laser beams, X-ray beams and radioactive radiation. Electrical energy can be generated, for example, by electrolysis processes. Examples of the free radical catalysts are potassium persulphate, dibenzoyl peroxide, azobisisobutyronitrile, di-tert-butyl peroxide and cyclohexanone peroxide. Ionic catalysts are organic alkali metal compounds, such as phenyllithium and naphthalenesodium, and Lewis acids, such as $BF_3$, $AlCl_3$, $SnCl_4$ and $TiCl_4$, or metal complexes in the form of aluminium or titanium compounds. The monomers can be polymerized in solution, suspension or emulsion or as such.

Where Y is a hydroxyl, amino, mercapto, epoxide or carboxyl group or one of their reactive derivatives, the compounds of the formula II can be grafted onto a polymeric backbone. Y is particularly preferably OH, $NH_2$, COOH or a reactive derivative thereof, in particular OH or a reactive derivative of the carboxyl group. The grafting reaction can be carried out by methods which are known per se, such as, for example, esterification, amidation, transesterification, transamidation, acetalization or etherification, which are described in the literature [for example, in standard works such as Houben-Weyl, Methoden der Organischen Chemie (Methods of Organic Chemistry), Georg-Thieme-Verlag, Stuttgart, or C. M. Paleos et al., J. Polym. Sci. Polym. Chem. 19 (1981) 1427], which disclosure is incorporated by reference herein.

A preferred grafting reaction is the reaction of monomers carrying mesogenic groups of the formula I a/b with organopolysiloxanes. For this purpose, linear or cyclic organohydropolysiloxanes are reacted, as described in, for example, European Patent Specification 0,060,335, which disclosure is incorporated by reference herein, with ethylenically unsaturated, mesogenic monomers of the formula II (Y is an alkylene group which has 2 to 5 C. atoms and is present in the ω- or (ω-1)-position), in about equimolar amounts, based on the amount of siloxane-hydrogen, in the presence of a catalyst which promotes the addition of silane hydrogen at aliphatic multiple bonds.

Suitable polymeric backbones are in principle all polymers the chains of which possess a certain degree of flexibility. These may be linear, branched or cyclic polymer chains. The degree of polymerization is usually at least 10, preferably 20–100. However, oligomers, in particular cyclic oligomers, having 3 to 15, in particular 4 to 7, monomer units are also suitable. The degree of flexible strength is usually measured according to DIN 53 452 on preferably amounts to 0.5 to 50 psi. $10^{-3}$.

Polymers having C—C main chains, in particular polyacrylates, polymethacrylates, poly-α-haloacrylates, poly-α-cyanoacrylates, polyacrylamides, polyacrylonitriles and polymethylenemalonates, are preferred. Polymers having heteroatoms in their main chain, for example polyethers, polyesters, polyamides, polyimides or polyurethanes, or in particular polysiloxanes, are also preferred.

Other particularly suitable polymeric backbones are liquid-crystalline main-chain polymers, as described by, for example, R. W. Lenz in L. L. Chapoy (editor), Recent Advances in Liquid Crystalline Polymers, London and New York, 1985, page 3, which disclosure is incorporated by reference herein.

Compounds of the formula II which possess appropriate terminal functional groups can be prepared by methods known per se, as described in the literature, (for example in the standard works such as Houben-Weyl, Methoden der Organischen Chemie (Methods of Organic Chemistry), Georg-Thieme-Verlag, Stuttgart), the preparation being carried out under reaction conditions which are familiar, and suitable for the stated reactions. Variants which are known per se but not mentioned here can also be used.

Preferred starting materials for the preparation of compounds of formula Ia/b are compounds of the formula III a/b,

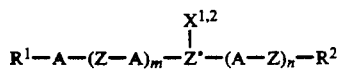   IIIa

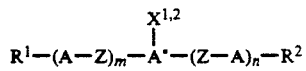   IIIb wherein
A, $A^0$, $A^1$, $R^1$, $R^2$, Z, $Z^0$, m and n have the meanings given formula Ia/b and $X^{1,2}$ designates $X^1$ or $X^2$, $X^1$ is a carboxyl group or one of its reactive derivatives, or an epoxide, halogen, haloalkyl, sulphonate or isocyanate group, and $X^2$ is an amino, alcohol or thiol group or a halogen atom.

To prepare compounds of the formula Ia/b, compounds of the formula IIIa/b containing a functional group $X^1$ can be subjected to esterification, etherification, amidation or a transition metal-catalysed coupling reaction with a compound which contains a functional group $X^2$ and is suitable as a spacer. The corresponding reaction of compounds of the formula IIIa/b which contain functional groups $X^2$ with compounds which contain functional groups $X^1$ and are suitable as spacers is also suitable.

Other compounds which are preferred for the preparation of compounds of the formula Ia/b are compounds of the formulae IV and/or V

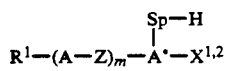   IV

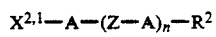   V wherein A, $A^0$, $R^1$, $R^2$, Sp, Z, $Z^0$, m and n have the meanings given for formula Ia/b, and $X^1$ and $X^2$ have the meanings given for formula IIIa/b.

Compounds of the formula IV containing a functional group $X^1$ can be subjected to esterification, etherification, amidation or a transition metal-catalysed coupling reaction with compounds of the formula V containing a functional group of the formula $X^2$. The corresponding reaction of compounds of the formula IV which contain the functional groups $X^2$ with compounds of the formula V which contain functional groups $X^1$ is also suitable.

Other preferred compounds for the preparation of compounds of the formula Ia/b are compounds of the formulae VI and/or VII,

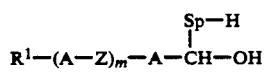   VI

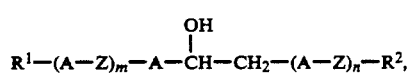   VII wherein A, $R^1$, $R^2$, Sp, Z, m and n have the meanings given for formula Ia/b.

Alcohols of the formula VI can be reacted with compounds of the formula V which contain a functional group $X^1$ having the meaning given for formula IIIa/b to give polymerizable compounds of the formula II which are suitable for the preparation of the polymer materials according to the invention.

Alcohols of the formula VII can be reacted with compounds which contain functional groups $X^1$ and are suitable as spacers, to give prepolymers of the formula II.

Some of the compounds of the formulae IIIa/b, IV, V, VI and VII which are suitable for the preparation of intermediates which can be polymerized to give materials according to the invention, of the formula Ia/b, are known, but the majority are new. They are prepared by methods known per se, as described in the literature (for example in standard works such as Houben-Weyl, Methoden der Organischen Chemie (Methods of Organic Chemistry), Georg-Thieme-Verlag, Stuttgart), the preparation being carried out under reaction conditions which are familiar, and suitable, for the stated reactions. Variants which are known per se but not mentioned here may also be used. They are used for the preparation of the liquid-crystalline polymer materials according to the invention.

The processes stated for the preparation of IIIa/b to VII are known per se as mentioned and simply correspond to the many known reactions familiar to skilled workers for incorporating the familiar functional groups, $X^1$, $X^2$, Sp, etc., into organic compounds. Usually, the reaction conditions known for the stated reactions are maintained. However, variants which are known per se but not mentioned here may also be used. In particular, the processes stated for the preparation of the parent substance which is not provided with a polymerizable side chain and is described by the formulae a to an can be used.

Some of the low molecular weight compounds of the formula II have broad mesophase ranges. However, compounds of the formula II which do not exhibit any mesophases are also suitable for the preparation of the polymer materials according to the invention.

The preparation of the homopolymers or copolymers from the polymerizable compounds of the formula II or their polymerizable derivatives is preferably carried out by free radical polymerization. The reaction is started, for example, by means of UV irradiation or free radical formers. The monomers can be polymerized in solution or as such.

Copolymer materials exhibiting liquid-crystalline phases according to the invention are obtained by copolymerization of the polymerizable compounds of the formula II or their polymerizable derivatives with monomers which carry no mesogenic radicals, which carry other mesogenic radicals (for example disc-like: German Patent Specification 3,430,482), which carry chiral radicals (for example German 2,831,909) or which carry dye radicals (German Offenlegungsschrift 3,211,400) all of which disclosures are incorporated by reference herein.

Starting from a monomer mixture having the concentration $X_1$, copolymerization with such monomers leads to a copolymer in which the monomer is incorporated in a concentration $X_1$ only when the copolymerization parameters of the monomer components are of comparable orders of magnitude. This is particularly important when it is desired to prepare a copolymer of a particular composition without difficulties, for example without taking into account the reaction kinetics. Hence, monomer components are preferably chosen to be those which have comparable copolymerization parameters, for example alkyl acrylates or alkyl methacrylates, which differ primarily by virtue of the substituents in the alkyl chain.

Copolymerization with monomers which do not carry any mesogenic radical generally leads to a reduction in the glass transition temperature and in the clear point. By a suitable choice of the spacer, it is often possible to bring the mesophase range into the temperature range suitable for the particular intended use.

Suitable monomers possessing a chiral radical are in principle all compounds of this type which possess asymmetric C atoms. However, compounds of the formula II or their polymerizable derivatives, in which M is a mesogenic group of the formula Ia or Ib, wherein one of the radicals $R^1$, $R^2$ and/or $R^3$ is an alkyl group in which one $CH_2$ group is replaced with $-CHCH_3-$, are preferably employed.

Finally, a large number of further possible variations arise from the fact that the compounds according to the invention combine liquid crystalline properties with typical polymer properties, such as the ability to form layers, films and fibres, easy deformability, etc. These properties can be modified in a manner known per se, by copolymerization or mixing with other components, by variation of the molecular weights, by adding a very wide variety of inorganic or organic additives and metals, and by many other treatments familiar to the skilled worker in the field of polymers.

The polymer materials according to the invention can be used as starting materials for the production of organic glasses having anisotropic properties which can be modified over wide ranges.

Applications of this type occur, for example, in the sector comprising light collectors and solar collectors or in connection with organic phototropic glasses. Furthermore, an important area of application has opened up in the field of optical memory. Other possible applications are being opened up in the field of magnetic memories. The materials according to the invention are also particularly suitable as matrix for substances having non-linear optical properties, for the production of "non-linear" optical components. The polymer materials according to the invention are also suitable for amplitude modulation and/or frequency modulation of laser beams and as organic substrates in electronics and for fiber and film technology. For example, the polymers having a liquid crystalline phase of this invention can be used to prepare the anisotropic organic glasses disclosed in Wunderlich and Grebowicz in Gordon, ed.: Liquid Crystal Polymers II/III, p. 16–50 analogous to the use of the known liquid crystalline polyesters. Similarly, they can be used analogously to the known liquid crystalline polymers disclosed in European Patent Application 0,141,512 and U.S. Pat. No. 4,293,435 for the purposes discussed in these references including those mentioned above, e.g., wherein in the field of optical memory, the polymers are used as information storage devices; in the field of magnetic memories, the polymers are used as information recording materials; in the production of non-linear optical components, the polymers are used as matrix materials, e.g., to suspend materials such as urea or nitroanilines; and in the field of laser-propagation, they are used for the mentioned modulations in a reflection/transmission mode.

The minimum relative number of mesogenic compound units per monomer unit of the polymer backbone will be determined by the minimum number necessary to achieve a liquid crystalline phase for the polymer. Typically, the range varies from one mesogenic unit per 10 monomer units to 4 mesogenic units per single monomer unit, preferably from 1:5 to 2:1 and particularly preferred from 1:2 to 1:1. The number will generally not be critical but will be determined by routine optimization experiments (e.g., observation of the nature of the resultant liquid crystalline phase as a function of the relative content of mesogenic units) and also in consideration of the steric factors involved.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

G denotes glass state, C denotes crystalline, N denotes nematic and I denotes isotropic (phase transistion temperatures in degrees Kelvin in each case).

EXAMPLE 1 a) 2-(11-Hydroxyundecyl)-hydroquinone obtained from 2-(10-carboxydecyl)-hydroquinone (prepared from p-benzo-quinone and methyl undec-10-enoate by using diborane and then carrying out hydrolysis) by reduction with lithium aluminium hydride is esterified with methacrylic acid to give 1-(11-methacryloyloxyundecyl)-hydroquinone.

34.8 g of the above compound are dissolved in 500 ml of dichloromethane. 20 g of triethylamine are added, after which 34.1 g of 4-methoxybenzoyl chloride are introduced slowly at 0° C. When the addition is complete, stirring is continued for 1 hour at room temperature, after which the mixture is washed with water and freed from the solvent under reduced pressure. The bis-(4-methoxyphenyl) ester of 2-(11-methacryloyloxyundecyl)-hydroquinone is obtained. In the supercooled state, the monomer exhibits a meta-stable monotropic nematic phase: C (336) N 296 I.

b) The bis(4-methoxyphenyl) ester of 2-(11-methacryloyloxyundecyl)-hydroquinone obtained according to Example 1a is polymerized in an approximately 1 molar solution in benzene, in the presence of 1 mol % of azobisisobutyronitrile at 60° C. The resulting polymer exhibits a stable liquid-crystalline phase: G 312 N 337 I.

EXAMPLE 2 a) 2-(11-Methacryloyloxyundecyl)-hydroquinone is esterified with 4-hexyloxybenzoyl chloride, analogously to the procedure described in Example 1a.

In the supercooled state, the resulting bis(4-hexyloxyphenyl) ester of 2-(11-methacryloyloxyundecyl)-hydroquinone has a monotropic metastable nematic phase: C (322) N 319 I.

b) The bis(4-hexyloxyphenyl) ester of 2-(11-methacryloyloxyundecyl)-hydroquinone obtained in Example 2a is polymerized in solution in benzene, analogously to the procedure described in Example 2. A polymer which exhibits a stable liquid-crystalline phase is obtained: G 282 N 335 I.

EXAMPLE 3 a) 2-(9-Carboxynonanoyl)-4-butylphenol obtained from 4-heptylphenol, sebacic anhydride and aluminium chloride by known processes is reduced to 2-(10-hydroxydecyl)-4-heptylphenol with lithium aluminium hydride/aluminium chloride.

b) 2-(10-Hydroxydecyl)-4-heptylphenol (0.1 mol) prepared according to Example 3a is reacted with methacryloyl chloride (0.1 mol) in 300 ml of pyridine at 5° C. to give 2-(10-methacryloyloxydecyl)-4-heptylphenol.

c) 0.1 mol of the phenol 3b obtained above, in 250 ml of dichloromethane, and 0.1 mol of triethylamine are treated with 0.1 mol of 4-propoxybenzoyl chloride at 0°-5° C. The mixture is stirred for 2 hours at this temperature, after which it is washed neutral with ice water, dried over sodium sulfate and evaporated down. 2-(10-Methacryloyl-oxydecyl)-4-heptylphenyl 4-propoxybenzoate remains in the form of an oil.

d) A solution of 0.05 mol of 2-(10-methacryloyloxydecyl)-4-heptylphenyl 4-propoxybenzoate in 100 ml of toluene is heated at 90° C. for 10 hours, after the addition of 0.5 g of azobisisobutyronitrile. The polymer separates out as a gel on cooling. After the addition of ethanol, the filterable amorphous product which exhibits a nematic liquid-crystalline phase is obtained.

EXAMPLE 4 a) 2-(10-Methacryloyloxydecyl)-4-heptylphenol (0.2 mol) obtained according to 3b is dissolved in 500 ml of dichloromethane and 0.1 mol of triethylamine. 0.1 mol of trans-4-propylcyclohexanecarbonyl chloride is added dropwise at +5° C. and the mixture is kept at this temperature for a further 30 minutes and then stirred for 1 hour at room temperature. It is washed neutral with water, dried, and freed from the solvent under reduced pressure and under mild conditions. Oily 2-(10-methacryloyloxydecyl)-4-heptylphenyl 4-propylcyclohexanecarboxylate remains.

b) A mixture of 0.1 mol of 2-(10-methacryloyloxydecyl)-4-heptylphenyl 4-propylcyclohexanecarboxylate, 0.005 mol of azobisisobutyronitrile and 400 ml of benzene is heated under reflux for 8 hours. The still hot polymer is then precipitated by stirring the mixture into 1 liter of methanol. The polymer possesses liquid-crystalline properties.

EXAMPLE 5 a) 27.7 g of 2-(3-cyano-4-fluorophenyl)-5-pentyl-1,3-dioxane (obtainable from 3-cyano-4-fluorobenzaldehyde and 2-pentyl-1,3-propanediol) in 380 ml of dioxane are added dropwise, in the course of 2 hours, to a boiling suspension of 4.0 g of lithium aluminium hydride in 300 ml of the same solvent. When the addition is complete, heating is continued for a further hour and decomposition is then effected with water. The solution is filtered off from the precipitated hydroxide and evaporated down under reduced pressure. 2-(3-Aminomethyl-4-fluorophenyl)-5-pentyl-1,3-dioxane is obtained.

b) A mixture of 14.0 g of 2-(3-aminomethyl-4-fluorophenyl)-5-pentyl-1,3-dioxane and 11.7 g of ethoxycarbonyloctanoyl chloride in 250 ml of pyridine is stirred for 3 hours at room temperature. It is then poured onto 2 liters of ice water, and the precipitated 2-(3-(8-ethoxycarbonyloctanoylamidomethyl)-4-fluorophenyl)-5-pentyl-1,3-dioxane is filtered off under suction.

c) 0.1 mol of the above amido ester 5b is introduced in portions into a boiling suspension of 7.5 g of lithium aluminium hydride in 400 ml of tetrahydrofuran. Heating for 1 hour, decomposing with water and working up as described in 5a) give 2-(3-(9-hydroxynonylaminomethyl)-4-fluorophenyl)-5-pentyl-1,3-dioxane.

d) 15 g of an acrylic acid/acrylate polymer containing free carboxyl groups are converted to the acid chloride with 10 g of thionyl chloride in a customary manner. The residue obtained after removing excess thionyl chloride is suspended in pyridine, and the suspension is stirred overnight with 5 g of 2-(3-(9-hydroxynonylaminomethyl)-4-fluorophenyl)-5-pentyl-1,3- dioxane. Filtration and washing with water give a polymer material which exhibits liquid-crystalline properties.

EXAMPLE 6 a) 15 g of trans-4-(4-(4-pentylcyclohexyl)-phenyl)-ethylbenzene in 50 ml of glacial acetic acid are slowly added dropwise, at −35° C., to a mixture of 50 g of fuming nitric acid and 50 g of acetic anhydride. Stirring is continued for a further 2 hours at this temperature, after which the mixture is poured onto 1 liter of ice water, the pale yellow precipitate is filtered off and the resulting mixtures of the mononitro-4-(4-(4-pentylcyclohexyl)-phenylethylbenzenes are dried.

b) The nitro compound obtained above is hydrogenated in a customary manner in ethanolic solution over palladium/activated carbon.

0.1 mol of amino-4-(4-(4-pentylcyclohexyl)-phenylethylbenzene prepared in this manner is heated for 6 hours at 90°–95° C. with 0.1 mol of dimethyl brassylate in 300 ml of toluene, with removal of the resulting methanol by distillation. When the reaction is complete, the product is freed from the solvent under reduced pressure. (12-Methoxycarbonyldodecanoylamino)-4-(4-(4-pentylcyclohexyl)-phenyl)-ethylbenzene is obtained.

c) 0.25 mol of the amidoester 6b is reduced with 0.5 mol of LiAlH$_4$ as described in Example 5c to give (13-hydroxydodecylamino)-4-(4-(4-pentylcyclohexyl)-phenyl)-ethylbenzene, and then grafted, in the manner described under 5d, onto a copolymer containing carboxyl groups. A polymer material exhibiting a liquid-crystalline phase is obtained.

EXAMPLE 7 a) 21.0 g of 5-butoxysalicylic acid, 22.2 g of 5-heptylpyrimidine-2-carbonyl chloride and 20.0 g of triethylamine in 500 ml of dichloromethane are subjected to an esterification reaction for 2 hours at +5° C.

b) 2-Carboxy-4-butoxyphenyl 5-heptylpyrimidine-2-carboxylate obtained according to 7a (0.1 mol) is converted to the acid chloride with 15.0 g of thionyl chloride in a customary manner. The crude product obtained after excess thionyl chloride has been removed by distillation is taken up in 450 ml of dichloromethane, 20.0 g of triethylamine are added and a solution of 0.1 mol of 2-(2-(2-hydroxyethoxy)-ethoxy)-ethyl acrylate is then introduced slowly. The mixture is stirred at room temperature for 1 hour and then washed with water, dried over sodium sulfate and freed from the solvent under reduced pressure. 2-(2-(2-(2-Acryloyloxyethoxy)-ethoxy)-ethoxycarbonyl)-4-butoxyphenyl 5-heptylpyrimidine-2-carboxylate is obtained.

c) 0.1 mol of the ester 7b into which an acryloyl group has been introduced, in 120 ml of benzene, is heated under reflux for 6 hours, after the addition of 2.5 g of azobisisobutyronitrile. After the mixture has been cooled, an equal volume of methanol is added. A polymer which exhibits a liquid-crystalline phase is isolated by filtration.

EXAMPLE 8 a) 1-(4'-Pentylbiphenyl-4-yl)-2-(4-propylcyclohexyl)-ethene, obtainable from 4-propylcyclohexanecarboxaldehyde and 4'-triphenylphosphono-4-pentylbiphenyl bromide by a Wittig reaction, is hydroborated with diborane in a customary manner and converted to 1-(4-propylcyclohexyl)-2-(4'-pentylbiphenyl-4-yl)-ethanol with alkaline hydrogen peroxide.

b) 0.1 mol of 1-(4-propylcyclohexyl)-2-(4'-pentylbiphenyl-4-yl)-ethanol is stirred with 0.1 mol of sodium hydride in 350 ml of toluene at room temperature until evolution of hydrogen is complete. 0.1 mol of allyl 9-bromopelargonate (obtained from allyl bromide and 9-bromopelargonic acid in dimethylformamide using potassium carbonate) is then added, and the mixture is kept at 60° C. for 3 hours. After cooling, the mixture is washed with water and dried over sodium sulfate, and the solvent is removed under reduced pressure to give allyl 9-(1-(4-propylcyclohexyl)-2-(4'-pentylbiphenyl-4-yl)-ethoxy)-pelargonate.

c) 10 g of the allyl ester 8b in 200 ml of xylene are kept at 90° C. for 3 hours, 200 mg of azobisisobutyronitrile being added. The polymer obtained on cooling is isolated by filtration. It exhibits liquid-crystalline properties above the glass transition temperature.

EXAMPLE 9 a) A mixture of 0.1 mol of 4-heptylbenzene, 0.1 mol of sebacic anhydride and 0.2 mol of aluminium chloride in 400 ml of carbon disulfide is heated under reflux for 4 hours. The reaction mixture is hydrolysed by adding 200 ml of 10% hydrochloric acid. The residue obtained after the organic phase has been separated off and the solvent removed by distillation is 4-sebacoyl-heptylbenzene.

b) 0.1 mol of 4-sebacoyl-heptylbenzene, 0.1 mol of sodium borohydride and 300 ml of methanol are stirred for 5 hours at 0° to +5° C. The mixture is then evaporated to dryness under reduced pressure, the residue is taken up in water, and the product, 10-(4-heptylphenyl)-10-hydroxydecanoic acid, is precipitated by adding dilute hydrochloric acid.

c) The corresponding methyl ester is prepared from 0.2 mol of the acid 9b described above in a customary manner by heating in methanol with the addition of sulfuric acid.

63.2 g of methyl 10-(4-heptylphenyl)-10-hydroxydecanoate are converted to the sodium alcoholate with 10 g of a 50% sodium hydride/liquid paraffin dispersion in 500 ml of dimethyl sulfoxide. When the evolution of hydrogen is complete, a solution of 69.6 g of 4-(4-mesyloxycyclohexyl)-butylcyclohexane (prepared from the corrsponding cyclohexanol with mesyl chloride/triethylamine in dichloromethane) in 120 ml of dimethyl sulfoxide is added dropwise at 20° C. Stirring is continued for a further 2 hours at 50° C., and the mixture is poured onto 2 liters of ice water and extracted with dichloromethane. The residue obtained after removal of the solvent is chromatographed over silica gel, using chloroform as the eluant. Methyl 10-(4-(4-butylcyclohexyl)-cyclohexyloxy)-10-(4-heptylphenyl)-decanoate is isolated.

d) 0.1 mol of the decanoate obtained in 9c is hydrolysed by boiling for 4 hours in a mixture of 300 ml of methanol, 100 ml of water and 25 g of potassium hydroxide. The reaction mixture obtained is acidified by adding semi-concentrated hydrochloric acid. The precipitate is filtered off and dried at elevated temperature. To convert it to the acid chloride, the crude acid prepared as described above is heated under reflux for 3 hours in the same amount by weight of thionyl chloride. Volatile components are removed under reduced pressure, and 10-(4-(4-butylcyclohexyl)-cyclohexyloxy)-10-(4-heptylphenyl)-decanoyl chloride is isolated in this manner.

e) 15 g of a hydroxylated polyacrylate in 5 g of acid chloride 9d in 200 ml of pyridine are stirred for 24 hours at room temperature, after the addition of 1 g of 4-dimethylaminopyridine.

The mixture is filtered, and the residue is washed with water and dried. The polymer prepared in this manner exhibits a liquid-crystalline phase.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A polymer having a liquid crystalline phase and comprising a polymeric backbone to which is bonded mesogenic groups, said mesogenic groups having the structure (a) a central portion comprising ring groups and optional bridging groups between these ring groups and (b) terminal groups, said mesogenic groups being bonded to the polymer backbone via a lateral position on one of said rings or via one of said bridging groups and being of the formula

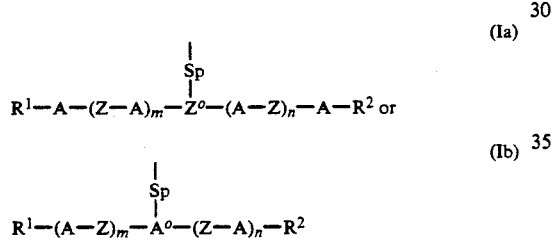

wherein $R^1$ and $R^2$ are each independently $C_{3-15}$-alkyl or $C_{3-15}$-alkyl wherein one or two non-adjacent $CH_2$ groups are replaced with —O—, —CO—, —O—CO—, —CO—O—, —CH=CH— or a combination thereof, or one of the radicals $R^1$ and $R^2$ is F, Cl, Br, NCS, $NO_2$, CN or $R^3$—A—Z, $R^3$ is $C_{1-15}$-alkyl or $C_{1-15}$-alkyl wherein one or two non-adjacent $CH_2$ groups are replaced with —O—, —CO—, —O—CO—, —CO—O—, —CH=CH—, or a combination thereof, or $R^3$ is F, Cl, Br, NCS or CN, Sp is a bond or a radical of the formula —$Q^1$—$W^1$—$Q^2$—$W^2$, $Q^1$ and $Q^2$ independently of one another are each a bond, $C_{1-25}$-alkylene or $C_{1-25}$-alkylene wherein one or more non-adjacent $CH_2$ groups are replaced with —O—, —S— or —N($C_1$-$C_6$-alkyl)—, $W^1$ and $W^2$ independently of one another are each a bond, —O—, —S—, —SO—, —$SO_2$—, —N($C_1$-$C_6$-alkyl)—, —CO—, —CO—O—, —O—CO—, —O—CO—O—, —CO—S—, —S—CO—, —CO—NH($C_1$-$C_6$-alkyl)—, —NH($C_1$-$C_6$-alkyl)—CO, —O—CO—NH($C_1$-$C_6$-alkyl)—, NH($C_1$-$C_6$-alkyl)—CO—O or $C_1$-$C_6$-alkylene, A in each case is 1,4-cyclohexylene, 1,4-cyclohexylene wherein one or two non-adjacent $CH_2$ groups are replaced with —O— or —S—, 1,4-cyclohexylene substituted in the 1-position by $C_1$-$C_4$-alkyl, F, Cl, Br, $CF_3$ or CN, 1,4-cyclohexylene 1-substituted by $C_{1-4}$-alkyl, F, Cl, Br, $CF_3$ or CN wherein 1 or 2 non-adjacent $CH_2$ groups on the ring are replaced with —O— or —S—, piperidine-1,4-diyl, 1,4-bicyclo-[2.2.2]octylene, 1,4-phenylene, 1,4-phenylene substituted by one or two of F, Cl, $CH_3$ or CN, 1,4-phenylene in which one or more CH groups are replaced with N, or 1,4-phenylene substituted by one or two of F, Cl, $CH_3$ or CN and in which one or more CH groups are replaced with N, $A^0$—Sp— is a radical of the formula

or a radical (1) wherein one or two non-adjacent $CH_2$ groups are replaced with —O— or —S— (radical A), or one of said radicals (1) or A wherein a —$CH_2CH_2$— group is replaced with —N=C— or —CH=CH— (radical B)

or one of said radicals (1), A or B which is substituted in the 1-position by $C_1$-$C_4$-alkyl, F, Cl, Br, $CF_3$ or CN, or $A^0$—Sp— is a radical (3) of the formula

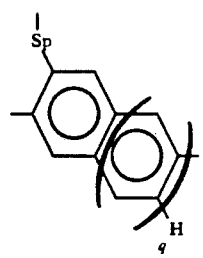

wherein q is 0 to 2, or a radical (3) wherein one or more CH groups is replaced with N (radical D), or a radical (3) or D which is substituted by one or two of F, Cl, $CH_3$ or CN, or $A^0$—Sp— is a radical of the formula

-continued (6)

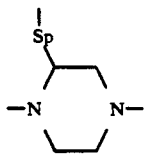

n and m are each 0 to 3,

Z in each case is independently —CO—O—, —O—CO—, —CH$_2$CH$_2$—, —CHCN—CH$_2$—, —CH$_2$—CHCN—, —CH=CH—, —OCH$_2$—, —CH$_2$O—, —CH=N—, —N=CH, —NO=N, —N=NO— or a single bond, and $Z^0$—Sp is —CH$_2$CHSp—, —CSpCN—CH$_2$—, —CHCN—CHSp—, —CSp=CH—, —CHSp—O— or —CSp=N, with the provisos that m+n is 0 to 3, said mesogenic groups have at least two rings, and m and n are at least one in formula Ib.

2. A polymer according to claim 1, wherein said mesogenic groups independently are of the formula (Ia) or (Ib) or a combination thereof.

3. A polymer according to claim 2, wherein the mesogenic group has the formula $R^1$—$A^0$(Sp—)—Z—A—$R^2$ $R^1$—$A^0$(Sp—)—A—$R^2$ or $R^1$—A—$Z^0$(Sp—)—A—$R^2$.

4. A polymer according to claim 2, wherein the mesogenic group has the formula $R^1$—A—$A^0$(Sp—)—Z—A—$R^2$ $R^1$—A—A—Z—$A^0$(Sp—)—$R^2$ $R^1$—$A^0$(Sp—)—Z—A—Z—A—$R^2$ $R^1$—A—Z—$A^0$(Sp—)—Z—A—$R^2$ $R^3$—A—Z—A—Z—$A^0$(Sp—)—$R^2$ $R^3$—$A^0$(Sp—)—A—Z—A—$R^2$ $R^3$—A—$A^0$(Sp—)—Z—A—$R^2$ $R^3$—A—A—Z—$A^0$(Sp—)—$R^2$ $R^1$—$A^0$(Sp—)—A—A—$R^2$ $R^1$—A—$A^0$(Sp—)—A—$R^2$ $R^1$—A—A—$Z^0$(Sp—)—A—$R^2$ $R^1$—A—$Z^0$(Sp—)—A—Z—$R^2$ $R^3$—A—$Z^0$(Sp—)—A—Z—A—$R^2$ $R^3$—A—Z—A—$Z^0$(Sp—)—A—$R^2$ or $R^3$—A—A—$Z^0$(Sp—)—A—$R^2$.

5. A polymer according to claim 2, wherein the mesogenic group has the formula $R^3$—$A^0$(Sp—)—Z—A—Z—A—Z—A—$R^3$ $R^3$—A—Z—$A^0$(Sp—)—Z—A—Z—A—$R^3$ $R^3$—$A^0$(Sp—)—A—Z—A—A—$R^3$ $R^3$—A—$A^0$(Sp—)—Z—A—A—$R^3$ $R^3$—$A^0$(Sp—)—Z—A—A—A—$R^3$ $R^3$—A—Z—$A^0$(Sp—)—A—A—$R^3$ $R^3$—A—Z—A—$A^0$(Sp—)—A—$R^3$ $R^3$—A—Z—A—A—$A^0$(Sp—)—$R^3$ $R^1$—$A^0$(Sp—)—A—Z—A—S—A—$R^3$ $R^1$—A—$A^0$(Sp—)—Z—A—Z—A—$R^3$ $R^1$—A—A—Z—$A^0$(Sp—)—Z—A—$R^3$ $R^1$—A—A—Z—A—Z—$A^0$(Sp—)—$R^3$ $R^3$—$A^0$(Sp—)—Z—A—A—Z—A—$R^2$ $R^3$—A—Z—$A^0$(Sp—)—A—Z—A—$R^2$ $R^3$—A—Z—A—$A^0$(Sp—)—Z—A—$R^2$ $R^3$—A—Z—A—A—Z—$A^0$(Sp—)—$R^2$ $R^1$—$A^0$(Sp—)—A—A—A—$R^3$ $R^1$—A—$A^0$(Sp—)—A—A—$R^3$ $R^1$—A—A—$A^0$(Sp—)—A—$R^3$ $R^1$—A—A—A—$A^0$(Sp—)—$R^3$ $R^1$—$A^0$(Sp—)—A—A—Z—A—$R^3$ $R^1$—A—$A^0$(Sp—)—A—Z—A—$R^3$ $R^1$—A—A—$A^0$(Sp—)—Z—A—$R^3$ $R^1$—A—A—A—Z—$A^0$(Sp—)—$R^3$ $R^1$—$A^0$(Sp—)—A—Z—A—A—$R^3$ $R^1$—A—$A^0$(Sp—)—Z—A—A—$R^3$ $R^1$—A—A—Z—$A^0$(Sp—)—A—$R^3$ $R^1$—A—A—Z—A—$A^0$(Sp—)—$R^3$ $R^3$—$A^0$(Sp—)—A—A—Z—A—$R^2$ $R^3$—A—$A^0$(Sp—)—A—Z—A—$R^2$ $R^3$—A—A—$A^0$(Sp—)—Z—A—$R^2$ $R^3$—A—A—A—Z—$A^0$(Sp—)—$R^2$ $R^3$—A—$Z^0$(Sp—)—A—Z—A—Z—A—$R^3$ $R^3$—A—Z—A—$Z^0$(Sp—)—A—Z—A—$R^3$ $R^3$—A—A—$Z^0$(Sp—)—A—A—$R^3$ $R^3$—A—$Z^0$(Sp—)—A—A—A—$R^3$ $R^1$—A—A—$Z^0$(Sp—)—A—Z—A—$R^3$ $R^1$—A—A—Z—A—$Z^0$(Sp—)—A—$R^3$

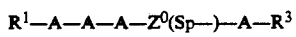
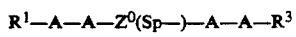

or

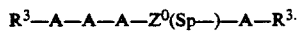

6. A polymer according to claim 2, wherein the mesogenic group has the formula

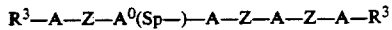
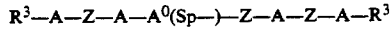
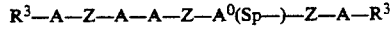
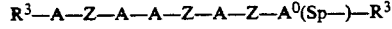
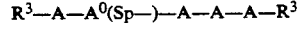
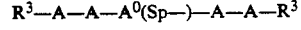
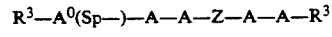
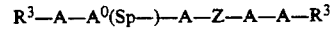
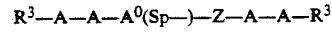
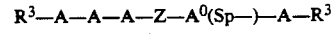
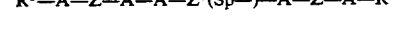

or

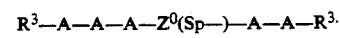

7. A polymer according to claim 2, wherein $R^1$, $R^2$ and $R^3$ are each independently alkyl, alkoxy, CN, R or NCS.

8. A polymer according to claim 2, wherein A and $A^0$ are each independently 1,4-cyclohexylene, 1,4-phenylene, 1,3-dioxan-2,5-diyl or pyridine-2,5-diyl.

9. A polymer according to claim 2, wherein Sp is $-Q^1-W^1-Q^2-W^2-$, wherein $Q^1$ and $Q^2$ are each independently alkylene having 1 to 15 C atoms, $W^1$ and $W^2$ are each independently $-O-$, $-S-$, $-O-CO-$, $-CO-O-$ or $-CO-NH-$.

10. A polymer according to claim 2, wherein n+m is 0 to 2.

11. A polymer according to claim 2, wherein each Z is independently a single bond, $-CO-O-$, $O-CO-$ or $-CH_2CH_2-$.

12. A polymer according to claim 2, wherein $Z^0-Sp$ is $-CH_2-CHSp-$, $-CSp=CH-$ or $CHSp-O-$.

13. A polymer according to claim 7, wherein $R^1$, $R^2$ and $R^3$ are each independently ethyl, propyl, butyl, pentyl, hexyl, heptyl, ethoxy, propoxy, butoxy, pentyloxy, hexyloxy, heptyloxy, methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

14. A polymer according to claim 2, wherein at least one of $R^1$, $R^2$ or $R^3$ is 2-oxapropyl, 2-oxabutyl, 3-oxabutyl, 2-oxapentyl, 3-oxapentyl, 4-oxapentyl, 2-oxahexyl, 3-oxahexyl, 4-oxahexyl, 5-oxahexyl, 2-oxaheptyl, 3-oxaheptyl, 4-oxaheptyl, 5-oxaheptyl, 6-oxaheptyl, 2-oxaoctyl, 3-oxaoctyl, 4-oxaoctyl, 5-oxaoctyl, 6-oxaoctyl, 7-oxaoctyl, 2-oxanonyl, 3-oxanonyl, 4-oxanonyl, 5-oxanonyl, 6-oxanonyl, 7-oxanonyl, 8-oxanonyl, 2-oxadecyl, 3-oxadecyl, 4-oxadecyl, 5-oxadecyl, 6-oxadecyl, 7-oxadecyl, 8-oxadecyl or 9-oxadecyl.

15. A polymer according to claim 2, wherein $R^1$, $R^2$ and $R^3$ are each independently vinyl, prop- 1-enyl, prop-2-enyl, but-1-enyl, but-2-enyl, but-3-enyl, pent-1-enyl, pent-2-enyl, pent-3-enyl, pent-4-enyl, hex-1-enyl, hex-2-enyl, hex-3-enyl, hex-4-enyl, hex-5-enyl, hept-1-enyl, hept-2-enyl, hept-3-enyl, hept-4-enyl, hept-5-enyl, hept-6-enyl, oct-1-enyl, oct-2-enyl, oct-3-enyl, oct-4-enyl, oct-5-enyl, oct-6-enyl, oct-7-enyl, non-1-enyl, non-2-enyl, non-3-enyl, non-4-enyl, non-5-enyl, non-6-enyl, non-7-enyl, non-8-enyl, dec-1-enyl, dec-2-enyl, dec-3-enyl, dec-4-enyl, dec-5-enyl, dec-6-enyl, dec-7-enyl, dec-8-enyl or dec-9-enyl.

16. A polymer according to claim 2, wherein the mesogenic group has the formula $R^1$-Phe-Phe-$R^2$
$R^1$-Phe-Cyc-$R^1$
$R^1$-Cyc-Cyc-$R^2$
$R^1$-Phe-Phe-Phe-$R^2$
$R^1$-Cyc-Phe-Phe-$R^2$
$R^1$-Cyc-Phe-Cyc-$R^2$
$R^1$-Cyc-Phe-Phe-Cyc-$R^2$
$R^1$-Phe-$CH_2CH_2$-Phe-$R^2$
$R^1$-Cyc-$CH_2CH_2$-Cyc-$R^2$
$R^1$-Phe-Cyc-$CH_2CH_2$-Phe-$R^2$
$R^1$-Cyc-$CH_2CH_2$-Phe-Phe-$R^2$
$R^1$-Phe-$CH_2CH_2$-Phe-Phe-$R^2$
$R^1$-Cyc-CH(CN)-$CH_2$-Cyc-$R^2$
$R^1$-Phe-COO-Phe-$R^2$
$R^1$-Cyc-COO-Phe-$R^2$
$R^1$-Cyc-COO-Phe-Phe-$R^2$
$R^1$-Cyc-Phe-COO-Phe-$R^2$
$R^1$-Cyc-Phe-OCO-Cyc-$R^2$
$R^1$-Phe-Cyc-COO-Phe-$R^2$
$R^1$-Phe-Cyc-OCO-Phe-$R^2$
$R^1$-Phe-Cyc-COO-Cyc-$R^2$
$R^1$-Phe-Phe-COO-Phe-Phe-$R^2$
$R^1$-Cyc-COO-Phe-Phe-$R^2$
$R^1$-Phe-Phe-COO-Phe-$R^2$
$R^1$-Cyc-COO-Phe-COO-Phe-$R^2$
$R^1$-Phe-$CH_2O$-Phe-$R^2$
$R^1$-Phe-Phe-$CH_2O$-Phe-$R^2$
$R^1$-Cyc-Phe-$CH_2O$-Phe-$R^2$
$R^1$-Phe-Cyc-$CH_2O$-Phe-$R^2$
$R^1$-Dio-Phe-$R^2$
$R^1$-Dio-Cyc-$R^2$
$R^1$-Cyc-Dio-Phe-$R^2$
$R^1$-Dio-Cyc-Phe-$R^2$
$R^1$-Dio-Phe-COO-Phe-$R^2$
$R^1$-Dio-Cyc-COO-Phe-$R^2$
$R^1$-Pym-Phe-$R^2$
$R^1$-Cyc-Pym-Phe-$R^2$
$R^1$-Pym-Phe-COO-Phe-$R^2$
$R^1$-Pym-Phe-$CH_2O$-Phe-$R^2$ $R^1$-Pym-Phe-OCO-Phe-$R^2$, wherein Phe is 1,4-phenylene, Cyc is trans-1,4-cyclohexylene, Dio is 2,5-dioxan-1,3-diyl and Pym is pyrimidine-2,5-diyl.

17. A polymer according to claim 16, wherein Sp is bonded to one of the ring groups Phe, Cyc, Dio or Pym or bonded to a bridging group —CH$_2$O—, —CH$_2$CH$_2$— or —CH(CN)—CH$_2$—.

18. A polymer of claim 2, wherein the polymer backbone has a degree of polymerization of 10–100.

19. A polymer of claim 2, wherein the polymeric backbone is that of (a) a polyacrylate, polymethacrylate, poly-α-haloacrylate, poly-α-cyanoacrylate, polyacrylamide, polyacrylonitrile, polymethylenemalonate, polyether, polyester, polyamide, polyimide, polyurethane, or polysiloxane (b) a copolymer of one of (a), or (c) a polymer which itself is liquid crystalline.

20. In an organic glass having anisotropic properties and based on a polymer having a liquid crystalline phase, the improvement wherein the polymer is one according to claim 1.

21. A polymer according to claim 1, wherein $R^1$ and $R^2$ are each independently C$_{4-15}$-alkyl or C$_{4-15}$-alkyl wherein one or two non-adjacent CH$_2$ groups are replaced with —O—, —CO—, —O—CO—, —CO—O—, —CH=CH—.

22. A polymer according to claim 2, wherein $R^1$ and $R^2$ are each independently butyl, pentyl, hexyl, heptyl, octyl, nonyl, decyl, undecyl, dodecyl, tridecyl, tetradecyl, pentadecyl, butoxy, petyloxy, hexyloxy, heptyloxy, octyloxy, nonyloxy, decyloxy, undecyloxy, dodecyloxy, tridecyloxy, tetradecyloxy, 3-oxabutyl, 2-, 3- or 4-oxapentyl, 2-, 3-, 4-or 5-oxahexyl, 2-, 3-, 4-, 5- or 6-oxaheptyl, 6-, 7- or 8-oxanonyl, 2-, 3-, 4-, 5-, 6-, 7-, 8-or 9-oxadecyl, but-1-enyl, but-2-enyl, but-3-enyl, pent-1-enyl, pent-2-enyl, pent-3-enyl, pent-4-enyl, hex-1-enyl, hex-2-enyl, hex-3-enyl, hex-4-enyl, hex-5-enyl, hept-1-enyl, hept-2-enyl, hept-3-enyl, hept-4-enyl, hept-5-enyl, hept-6-enyl, oct-1-enyl, oct-2-enyl, oct-3-enyl, oct-4-enyl, oct-5-enyl, oct-6-enyl, oct-7-enyl, non-1-enyl, non-2-enyl, non-3-enyl, non-4-enyl, non-5-enyl, non-6-enyl, non-7-enyl, non-8-enyl, dec-1-enyl, dec-2-enyl, dec-3-enyl, dec-4-enyl, dec-5-enyl, dec-6-enyl, dec-7-enyl, dec-8-enyl, dec-9-enyl.

23. A polymer according to claim 1, wherein m is 1, 2 or 3 and $R^1$ is F, Cl, Br, NCS, NO$_2$ or CN.

24. A polymer according to claim 1, wherein $R^3$ is C$_{3-15}$-alkyl or C$_{3-15}$-alkyl wherein one or two non-adjacent CH$_2$ groups are replaced with —O—, —CO—, —O—CO—, —CO—O—, —CH=CH—or a combination thereof.

* * * * *